United States Patent
Linnartz

(10) Patent No.: US 8,588,350 B2
(45) Date of Patent: Nov. 19, 2013

(54) DIVERSITY RECEIVER HAVING CROSS COUPLED CHANNEL PARAMETER ESTIMATION

(75) Inventor: Johan Paul Marie Gerard Linnartz, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 2032 days.

(21) Appl. No.: 10/537,598

(22) PCT Filed: Nov. 6, 2003

(86) PCT No.: PCT/IB03/50020
§ 371 (c)(1),
(2), (4) Date: Jun. 6, 2005

(87) PCT Pub. No.: WO2004/054132
PCT Pub. Date: Jun. 24, 2004

(65) Prior Publication Data
US 2006/0093080 A1 May 4, 2006

(30) Foreign Application Priority Data

Dec. 9, 2002 (EP) .................................. 02081062

(51) Int. Cl.
*H04B 7/10* (2006.01)
*H04L 1/02* (2006.01)

(52) U.S. Cl.
USPC .......................................... 375/347; 375/349

(58) Field of Classification Search
USPC ................................................. 375/347, 349
See application file for complete search history.

(56) References Cited

U.S. PATENT DOCUMENTS

| | | | | |
|---|---|---|---|---|
| 5,202,903 A | * | 4/1993 | Okanoue | 375/347 |
| 5,787,131 A | * | 7/1998 | Bottomley | 375/347 |
| 6,137,843 A | * | 10/2000 | Chennakeshu et al. | 375/340 |
| 6,445,757 B1 | * | 9/2002 | Raitola et al. | 375/347 |
| 6,768,713 B1 | * | 7/2004 | Siala et al. | 370/203 |
| 6,999,538 B2 | * | 2/2006 | Kung et al. | 375/347 |
| 7,058,146 B2 | * | 6/2006 | Paulraj et al. | 375/347 |
| 7,099,413 B2 | * | 8/2006 | Chuang et al. | 375/347 |
| 7,324,437 B1 | * | 1/2008 | Czylwik et al. | 370/210 |
| 2003/0108135 A1 | * | 6/2003 | Frigon | 375/354 |

FOREIGN PATENT DOCUMENTS

| | | |
|---|---|---|
| JP | 4185130 A | 7/1992 |
| JP | 19181699 A | 7/1997 |
| JP | 2001237754 A | 8/2001 |

OTHER PUBLICATIONS

Li: "Pilot-Symbol-Aided Channel Estimation for OFDM in Wireless Systems"; IEEE Transactions on Vehicular Technology, Vol. 49, No. 4, Jul. 2000, pp. 1207-1215.
Schmidl et al: "The Use of Iterative Channel Estimation (ICE) to Improve Link Margin in Wideband CDMA Systems";IEEE 49th Conference on Vehicular Technology Conference, Houston, TX May 1999, pp. 1307-1311.

* cited by examiner

*Primary Examiner* — Shuwang Liu
*Assistant Examiner* — Nader Bolourchi

(57) ABSTRACT

A diversity receiver has multiple antenna receiving branches. Each branch has means for estimating at least a receiving channel parameter, and the channel parameter estimating means in one branch are coupled to the channel parameter estimating means in an other branch. This way at least a part of the channel parameter estimate in the one branch is used as an aid for estimating at least a receiving channel parameter in the other branch. This saves processing time and processing power in the diversity receiver, and even results in a higher accuracy when selecting the best antenna and receiving branch.

9 Claims, 2 Drawing Sheets

DIVERSITY RECEIVER HAVING CROSS COUPLED CHANNEL PARAMETER ESTIMATION

Figure 1:
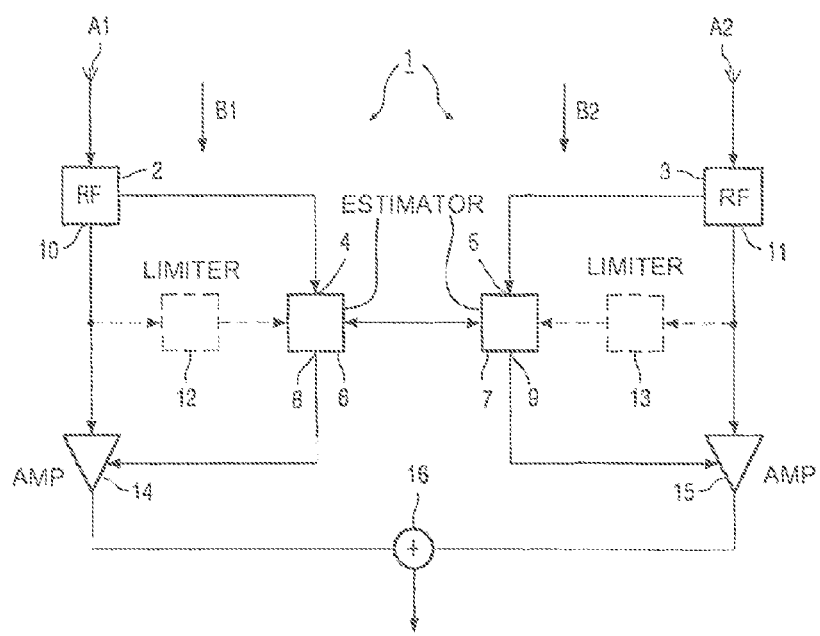

This application is a 35 U.S.C. 371 of International Patent Application No. PCT/IB03/50020 filed Nov. 6, 2003, and claims the benefit thereof.

The present invention relates to a diversity receiver having multiple antenna receiving branches.

The present invention also relates to a mobile radio communication device provided with such a diversity receiver, a method wherein a signal is received through multiple antenna receiving branches, and relates to signals suited for applying the method.

Such a diversity receiver is known from JP-A-04-185130. The known diversity receiver has two RF antenna receiving branches. Each RF branch comprises an antenna, such that the two antennas are spatially separated at such a mutual distance that the antennas receive virtually non-correlated signals. In the known diversity receiver the branches further comprise in succession: filters coupled to the respective antennas, amplifiers, a delay device and a synthesizer or the like. Outputs of the branches are coupled to a combining circuit. The known diversity receiver reduces the effect of multipath distortion and attains a stable reception of received radio channels in a spread spectrum communication environment.

It is a disadvantage of the known diversity receiver that a substantial amount of processing power is required for controlling the reception and selection of the received radio channels.

It is an object of the present invention to provide a diversity receiver showing more flexibility and enhanced trade-off between processing power and accuracy.

Thereto the diversity receiver according to the invention is characterized in that each branch has means for estimating at least a receiving channel parameter, and that the channel parameter estimating means in one branch are coupled to the channel parameter estimating means in an other branch for using at least a part of the channel parameter estimate in the one branch as an aid for estimating at least a receiving channel parameter in the other branch.

Similarly the method according to the invention is characterized in that in each branch an estimation is made about a received channel, and that channel estimation results from one branch are being used as an aid for estimating the received channel in an other branch.

It is an advantage of the diversity receiver and method according to the invention that in those diversity schemes which require knowledge about the channel characteristics, advantage can be taken of the fact that coupling between channel estimating means in the one branch and channel estimating means in an other branch at least partly prevents duplication of diversity processing and calculations. By exchanging information in particular in the form of channel parameter estimate information between various diversity branches, part of the diversity processing and calculations turn out to be redundant if observed from the angle of time. This way the fact is exploited that one antenna takes on a position for which the channel parameter estimates can be determined, while a little earlier or later at least partly the same calculations are made for an other antenna. Such calculations can now be omitted. Or put otherwise, when using the same processing power within an amount of time the channel estimation parameter results will advantageously be more accurate. These advantages also hold for a mobile communication device comprising such a diversity receiver.

One embodiment of the diversity receiver according to the invention is characterized in that the channel parameter estimate in the one branch is used as a starting point for the channel parameter estimate in the other branch.

Without redundancy in calculations and given the same processing power, channel estimates can now be calculated in a shorter amount of time or given an amount of processing time less processing power and calculations are required for acquiring the same results.

Another embodiment of the diversity receiver according to the invention is characterized in that the channel parameter estimate in the one branch provides a coarse channel parameter estimate, which coarse channel parameter estimate is used as a start for the channel parameter estimate in the other branch.

This embodiment of the diversity receiver according to the invention leads to more accurate channel estimate results.

Still another embodiment of the diversity receiver according to the invention is characterized in that the estimating means in the other branch are coupled to the estimating means in said one branch for using at least a part of the channel parameter estimate in the other branch as an aid for estimating the receiving parameter channel in said one branch.

This way the estimating means in the various branches are mutually coupled to one another leading to a multiplicity of mutually exchanged channel parameter estimate information or associated information accordingly providing a multiplicity of advantages.

A further embodiment of the diversity receiver according to the invention is characterized in that the diversity receiver has two antenna receiving branches.

This provides a simple and cost effective embodiment of the diversity receiver according to the invention.

Another advantageous further embodiment of the diversity receiver according to the invention is characterized in that the system is arranged for estimating a time delay between the appearance of a certain channel parameter estimate in the various branches.

At present the diversity receiver and method according to the invention will be elucidated further together with their additional advantages, while reference is being made to the appended drawing, showing schematized embodiments of the diversity receiver according to the invention.

Figure 2:
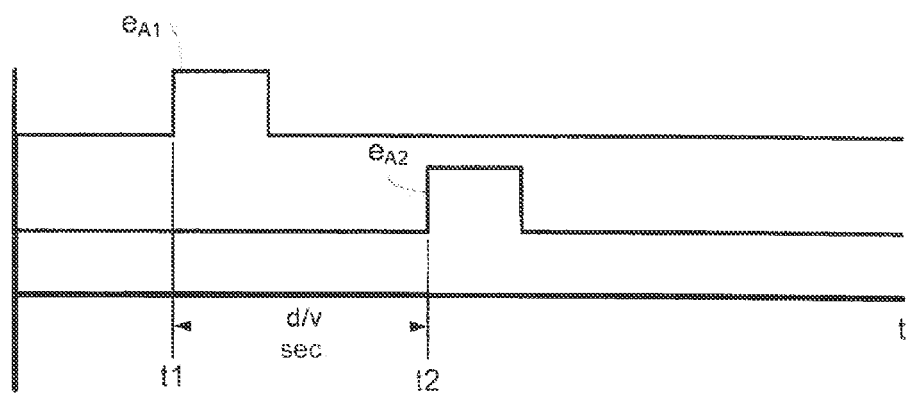

FIG. 1 shows a schematic view of a particular diversity receiver according to the present system; and FIG. 2 shows a timing diagram according to the present system.

FIG. 1 shows a schematic view of a particular diversity receiver 1 having two antenna receiving branches B1 and B2 with the help whereof a method for receiving diversity signals will be explained. Each branch B1, B2 comprises receiving means, generally referred to as Radio Frequency (RF) receiving means 2, 3. The receiver as shown comprises two respective antennas A1, A2 coupled to the RF means 2, 3 respectively. The RF means 2, 3 generally include (not explicitly shown) either or not embodied in quadrature: filters, (low noise) amplifiers, mixers, oscillators, converters, analog or digital processing means, all as generally known in the relevant art. For example from the RF means 2 and 3 one or more signals are fed to inputs 4 and 5 respectively of channel parameter estimating means 6 and 7 respectively, in order to allow these means 6 and 7 to derive therefrom respective channel parameter quantities on outputs 8 and 9 respectively. Examples of channel parameters are for example the quality of received signals in one or more channels, or the channel transfer functions e.g. amplitudes and phases of each receiving channel in each branch. The channel parameter estimating means 6 and 7 can—at wish also—derive the respective parameter signals from outputs 10 and 11 of the RF means 2 and 3. For example the quality parameters may even be derived from data signals provided by output signals from hard limiters 12 and 13, as shown by dashed lines in FIG. 1. The channel parameter signals on the outputs 8 and 9 each comprise a measure for the estimate of the received signal in that particular receiving channel of the branches B1, B2 concerned. When the parameter concerns the channel quality such quality may be the common Received Signal Strength Indication, or shortly RRSI. Another example concerns checksums, used in certain cases in a Digital Enhanced Cordless Telecommunication (DECT) systems. The quality measurement may either be performed continuous or not. By means of the quality signals the diversity device 1 may determine which of the antennas A1, A2 is the best to be selected. This is schematically shown in FIG. 1. by means of controllable amplifiers 14 and 15 and a summing device 16 coupled to the amplifiers 14 and 15. Often both amplitude and phase information is used to ensure coherent addition of the signals in the summing device 16. In such case the controllable amplifiers 14 and 15 need to perform phase corrections. In fact in a practical embodiment it may well be that amplifiers 14 and 15 align the phases of the received signals, but do not modify the amplitudes of the signals. This process is called "equal gain combining". As described above another example of a channel parameter is the channel transfer function. Like the quality parameter the channel transfer function parameter calculation results may at least partly be exchanged between the channel parameter means 6 and 7. Possibly both the quality parameters and the channel transfer parameters may be exchanged in order to reduce the total amount of calculations for selecting the best antenna A1 or A2.

The channel estimating means 6 in one branch B1 are coupled to the channel estimating means 7 in the other branch B1 for using at least a part of the channel estimate in the one branch B1 as an aid for estimating the receiving channel in the other branch B2. Apart from the fact that one of the channel estimate means 6, 7 is coupled to its counterpart channel estimate means in the other branch for a one way exchange of channel estimate information or of information which can be of help therefor, it is also possible that the means 6, 7 mutually exchange such information at least during a certain period of time. This saves a considerable amount of processing power or leads to an increase of the accuracy of the channel estimates if the processing power remains constant. For example the channel estimate resulting from one of the estimate means 6 or 7 is used as a starting point for processing and calculations made in the other of the channel estimate means 7 or 6 or/and vice versa. It is also possible that the channel estimate calculated by the means 6, 7 in the one branch B1, B2 provides a coarse channel estimate, which coarse channel estimate is used as a starting point for processing and calculations made in the other of the channel estimate means 7, 6 or/and vice versa.

The positions of the antennas A1 and A2 are such that the instantaneous received signals thereon are not correlated. However, if, with respect to the received signals, a time difference not equal to zero is observed, then the signals show correlation, which is advantageously used in the receiver 1. Generally, the distance d between the antennas A1 and A2 is much larger than the wavelength of the received signal divided by two in order to acquire optimum antenna diversity results. If the receiver 1 is positioned in a vehicle moving at a speed v and if the antennas are roughly positioned on a straight line in the direction of motion, then it can be said that channel parameter estimates ($e_{A1}$) from the one antenna are used to better estimate the channel ($e_{A2}$) for the other antenna, but a time delay of d/v seconds later, as shown in FIG. 2. In another practical embodiment of the receiver 1, the delay value of d/v may be estimated explicitly, for example, in the estimating means 6, 7. The delay value is then used for the estimated channel parameters, to optimally synchronize the estimation process in the various branches.

Although only two branches are shown in the FIG. 1 it is also possible to have more than two branches and associated antennas. In that case the respective channel estimating means may at wish exchange channel estimate information or information related thereto, such as intermediate results, or may for example all mutually exchange such information, in order to use at least a part of the channel estimate or related information in one of the branches as an aid for estimating the receiving channel in one of the other branches.

The method explained above can also find application in mobile communication devices or systems, such as car radio or car communication systems. Examples thereof are Orthogonal Frequency Division Multiplexing (OFDM) systems, where diversity generally requires a lot of calculating and processing time, due to the multiplicity of sub-carriers carrying independent data. Other examples are Digital Video Broadband (DVB) systems, such as DVB-T (Terrestrial), ISDB systems, Carrier Detect Multiple Access (CDMA) systems, for instance cellular CDMA; Universal Mobile Telecommunication Systems (UMTS), Global Systems for Mobile communications (GSM) and the mentioned DECT systems. In the case of OFDM signals, the (vector) outputs 10, 11 typically consist of multiple parallel subcarrier signals (e.g. 64 for WLANs, 2 k . . . 8 k for DVB-T). In that case the branches are repeated for every subcarrier. In the case of direct sequence CDMA, the receiver branches typically form a so called rake receiver. In such case the outputs 10 and 11 each carry vector signals, containing the signals in the various fingers of the rake. The controllable amplifiers 14, 15 then operate on all finger signals. The addition in summing device 16 then accumulates all signals of all fingers in all branches.

The invention claimed is:

1. A diversity receiver comprising multiple antenna receiving branches, each of said multiple antenna receiving branches comprising estimating means for estimating at least a receiving channel parameter, wherein a first estimating means in one branch of the multiple antenna receiving branches is operatively connected to a second estimating means in a further branch of the multiple antenna receiving branches for using at least a part of the channel parameter estimate in the one branch as an aid for estimating at least a receiving channel parameter in the further branch.

2. The diversity receiver as claimed in claim 1, wherein the channel parameter estimate in the one branch is used as a starting point for the channel parameter estimate in the further branch.

3. The diversity receiver as claimed in claim 1, wherein the channel parameter estimate in the one branch provides a coarse channel parameter estimate, and wherein said coarse channel parameter estimate is used as a start for the channel parameter estimate in the further branch.

4. The diversity receiver as claimed in claim 1, wherein the second estimating means in the further branch is operatively connected to the first estimating means in said one branch for using at least a part of the channel parameter estimate in the further branch as an aid for estimating the receiving parameter channel in said one branch.

5. The diversity receiver as claimed in claim 1, wherein the diversity receiver has two antenna receiving branches.

6. The diversity receiver as claimed in claim 1, wherein the diversity receiver is arranged for estimating a time delay between the appearance of a certain channel parameter estimate in the various branches.

7. A mobile radio communication device provided with the diversity receiver as claimed in claim 1.

8. A method for receiving a signal comprising the acts of:
- receiving the signal through multiple antenna receiving branches;
- in each branch, estimating, using estimating means, parameters about a received channel to form channel estimation results;
- exchanging the channel estimation results between a first branch of the multiple antenna receiving branches and a second branch of the multiple antenna receiving branches; and
- using first channel estimation results about a first received channel from the first branch in the estimating means in the second branch as an aid for estimating parameters about a second received channel in the second branch and forming second channel estimation results.

9. The method of claim 8, wherein said method further comprises the acts of:
- estimating a delay value between a first channel parameter in the first branch and the first channel parameter in the second branch; and
- synchronizing estimation in the branches by using the delay value.

* * * * *